(12) United States Patent
Sasabayashi et al.

(10) Patent No.: US 11,380,483 B2
(45) Date of Patent: Jul. 5, 2022

(54) MULTILAYER CERAMIC CAPACITOR

(71) Applicant: Murata Manufacturing Co., Ltd., Nagaokakyo (JP)

(72) Inventors: Takehisa Sasabayashi, Nagaokakyo (JP); Yasuyuki Shimada, Nagaokakyo (JP); Naoto Muranishi, Nagaokakyo (JP); Shinichi Kokawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/131,931

(22) Filed: Dec. 23, 2020

(65) Prior Publication Data
US 2021/0210285 A1 Jul. 8, 2021

(30) Foreign Application Priority Data

Jan. 7, 2020 (JP) .............................. JP2020-001059

(51) Int. Cl.
*H01G 4/12* (2006.01)
*H01G 4/248* (2006.01)
*H01G 4/232* (2006.01)
*H01G 4/30* (2006.01)

(52) U.S. Cl.
CPC ......... *H01G 4/1227* (2013.01); *H01G 4/2325* (2013.01); *H01G 4/248* (2013.01); *H01G 4/30* (2013.01)

(58) Field of Classification Search
None
See application file for complete search history.

(56) References Cited

U.S. PATENT DOCUMENTS

| 2006/0043523 | A1 | 3/2006 | Ito | |
|---|---|---|---|---|
| 2016/0049244 | A1* | 2/2016 | Kitano | H01G 4/1209 361/301.4 |
| 2016/0049245 | A1* | 2/2016 | Kitano | H01G 4/248 361/301.4 |
| 2016/0049246 | A1* | 2/2016 | Kitano | H01G 4/30 361/301.4 |
| 2016/0049247 | A1* | 2/2016 | Kitano | H01G 4/248 361/301.4 |
| 2021/0210285 | A1* | 7/2021 | Sasabayashi | H01G 4/1227 |
| 2021/0287853 | A1* | 9/2021 | Sasabayashi | H01G 4/008 |
| 2021/0287854 | A1* | 9/2021 | Sasabayashi | H01G 4/30 |

FOREIGN PATENT DOCUMENTS

JP  2006073623 A  3/2006

* cited by examiner

*Primary Examiner* — Dion R. Ferguson
(74) *Attorney, Agent, or Firm* — ArentFox Schiff LLP

(57) ABSTRACT

In a multilayer ceramic capacitor, when a ratio of an ICP peak intensity of Mn to an ICP peak intensity of Ti is an Mn/Ti peak intensity ratio, a value of the Mn/Ti peak intensity ratio in a dielectric ceramic layer in at least one of a main surface outer layer portion, a side surface outer layer portion, and an end surface outer layer portion is in a range of two times to fifteen times a value of the Mn/Ti peak intensity ratio in a dielectric ceramic layer in a central portion of an effective portion in a width direction, a length direction, and a stacking direction.

15 Claims, 11 Drawing Sheets

MULTILAYER CERAMIC CAPACITOR

CROSS REFERENCE TO RELATED APPLICATIONS

The present application claims priority to Japanese Patent Application No. 2020-001059, filed Jan. 7, 2020, the entire contents of which is incorporated herein by reference.

BACKGROUND OF THE INVENTION

Field of the Invention

The present invention relates to a ceramic capacitor, and specifically to a multilayer ceramic capacitor having a structure in which a plurality of dielectric ceramic layers and a plurality of internal electrode layers are stacked.

Description of the Background Art

There are conventionally widely used multilayer ceramic capacitors each having a structure in which a multilayer body including a stack of a plurality of dielectric ceramic layers and a plurality of internal electrode layers has both end surfaces having respective external electrodes disposed thereon and electrically conduct to the internal electrode layers.

Japanese Patent Laid-Open No. 2006-73623 discloses a multilayer ceramic capacitor having the above-mentioned structure. The multilayer ceramic capacitor includes an element body formed by alternately stacking dielectric ceramic layers and internal electrode layers. At least one of each dielectric ceramic layer and each internal electrode layer has a different phase containing an Mg element and an Mn element.

According to Japanese Patent Laid-Open No. 2006-73623, the above-described configuration allows implementation of a multilayer ceramic capacitor having low IR temperature dependence and excellent average lifetime characteristics.

SUMMARY OF THE INVENTION

However, in the structure of the multilayer ceramic capacitor disclosed in Japanese Patent Laid-Open No. 2006-73623, the internal electrode layers are smaller in plane surface area than the dielectric ceramic layers. Thereby, a level difference exists between each dielectric ceramic layer and the peripheral edge portion of each internal electrode layer, excluding a portion of each internal electrode layer that extends to reach the end surface of the element body. Thus, the internal electrode layer may be bent due to this level difference, thereby leading to problems that a short circuit tends to occur between the internal electrode layers, and the high-temperature load reliability tends to decrease.

In particular, as thinner dielectric ceramic layers are provided and a larger number of internal electrode layers and dielectric ceramic layers are stacked, a short circuit between the internal electrode layers is more likely to occur, so that the reliability tends to decrease.

Thus, a multilayer ceramic capacitor has been manufactured by stacking ceramic green sheets each prepared to have no level difference between a region where an internal electrode pattern to be formed as an internal electrode layer after firing is formed and a region where no internal electrode pattern is formed (such a ceramic green sheet will be hereinafter also referred to as a "zero level difference sheet").

Specifically, for example, a conductive paste is applied to a prescribed region on a ceramic green sheet to thereby form an internal electrode pattern that is to be formed as an internal electrode layer after firing. Then, a ceramic paste is applied to a region having no internal electrode paste formed thereon, to form a ceramic layer for level difference elimination, to thereby form ceramic green sheets each having no level difference between a region having an internal electrode pattern as an internal electrode layer formed thereon and a region having no internal electrode pattern formed thereon. Then, these ceramic green sheets are stacked to form a multilayer body. A method for forming a multilayer body in this way has been known.

Even in this case, however, due to extremely small gaps or the like existing between each internal electrode pattern and each ceramic green sheet for level difference elimination, a bent portion may be formed in some of the internal electrode layers of the multilayer body obtained after firing, which may cause cracking and chipping in the multilayer body, deterioration in high-temperature load reliability, and the like.

Thus, it is desirable to take measures for suppressing or preventing occurrence of the above-described problems in a multilayer ceramic capacitor.

The present invention has been made in order to solve the above-described problems, and an object of the present invention is to provide a multilayer ceramic capacitor that is less likely to cause cracking and chipping in a multilayer body and that is excellent in high-temperature load reliability.

In order to solve the above-described problems, a multilayer ceramic capacitor according to the present invention includes: a multilayer body including a plurality of dielectric ceramic layers and a plurality of internal electrode layers that are alternately arranged in a stack, wherein the dielectric ceramic layers each contain Ba, Ti, Mn, and a rare earth element. The multilayer body has: (a) a first main surface and a second main surface that face each other in a stacking direction in which the dielectric ceramic layers and the internal electrode layers are stacked; (b) a first side surface and a second side surface that face each other in a width direction orthogonal to both the stacking direction and a direction in which the internal electrode layers extend to reach a surface of the multilayer body; and (c) a first end surface and a second end surface that face each other in a length direction orthogonal to both the stacking direction and the width direction. First and second external electrodes are disposed on each of the first end surface and the second end surface, respectively, and electrically connected to alternate first and second sets of the plurality of internal electrode layers. A region where the internal electrode layers overlap with each other in a view seen in the stacking direction is defined as an effective portion, each of regions sandwiching the effective portion in the stacking direction is defined as a main surface outer layer portion, each of regions sandwiching the effective portion in the width direction is defined as a side surface outer layer portion, and each of regions sandwiching the effective portion in the length direction is defined as an end surface outer layer portion.

Assuming that a ratio of a peak intensity of Mn by laser ICP (inductively coupled plasma) to a peak intensity of Ti by laser ICP is defined as an Mn/Ti peak intensity ratio, a value of the Mn/Ti peak intensity ratio in the dielectric ceramic layer in at least one of the main surface outer layer portion, the side surface outer layer portion, and the end surface outer layer portion is in a range of two times to fifteen times the value of the Mn/Ti peak intensity ratio in the dielectric ceramic layer in a central portion of the effective portion in the width direction, the length direction, and the stacking direction.

In the multilayer ceramic capacitor of the present invention, the peak intensity ratio of Mn to Ti is set higher in the dielectric ceramic layer in at least one of the main surface outer layer portion, the side surface outer layer portion, and the end surface outer layer portion than in the dielectric ceramic layer in the central portion of the effective portion in the width direction, the length direction, and the stacking direction. Thus, a multilayer ceramic capacitor that is less likely to have structural defects and cracking or chipping and that is excellent in high-temperature load reliability can be provided.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

With reference to embodiments of the present invention, features of the present invention will be specifically described below.

Figure 1:
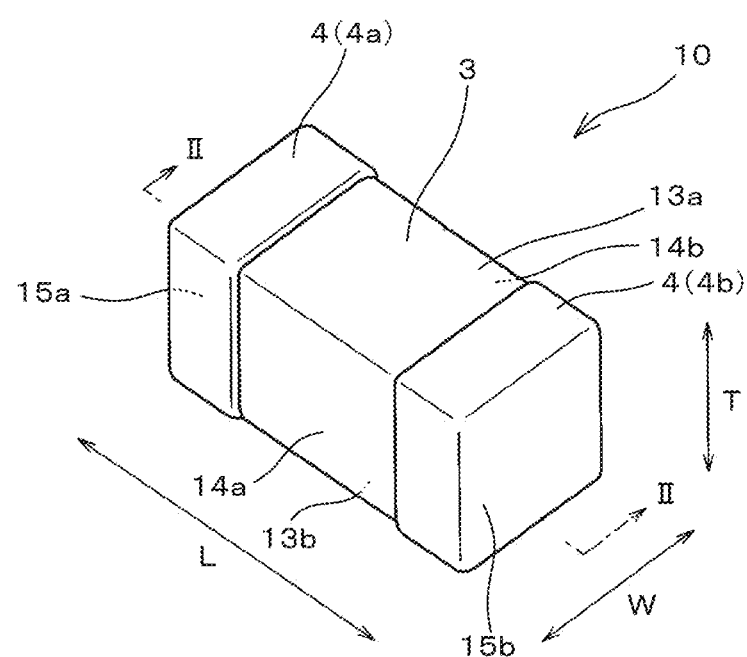
FIG. 1 is a perspective view of a multilayer ceramic capacitor according to one embodiment of the present invention.
Figure 2:
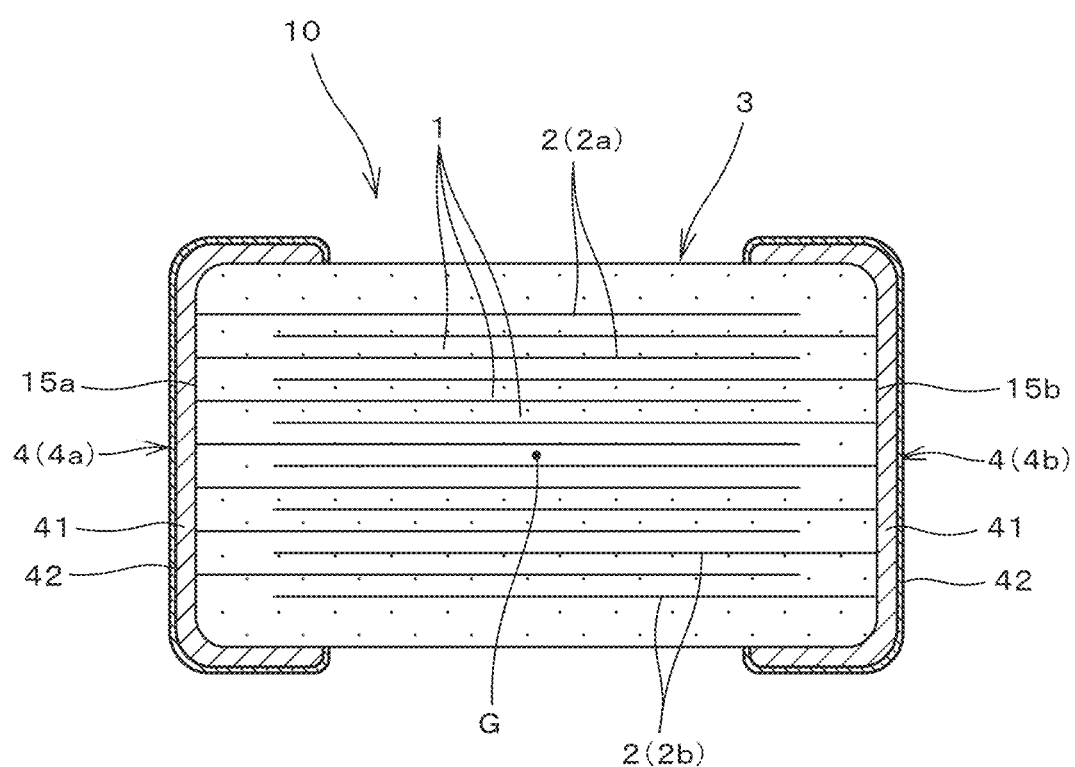
FIG. 2 is a cross-sectional view of the multilayer ceramic capacitor shown in FIG. 1, which is taken along a line II-II.

FIG. 1 is a perspective view of a multilayer ceramic capacitor according to one embodiment of the present invention, and FIG. 2 is a front cross-sectional view thereof.

As shown in FIGS. 1 and 2, a multilayer ceramic capacitor 10 entirely has a rectangular parallelepiped shape, and includes: a multilayer body 3 having a stack of a plurality of dielectric ceramic layers 1 and a plurality of internal electrode layers 2 (2a, 2b); and an external electrode 4 (4a, 4b) disposed at a prescribed position of multilayer body 3 so as to electrically conduct to internal electrode layers 2.

Multilayer body 3 includes: (a) a first main surface 13a and a second main surface 13b facing each other in a stacking direction T in which dielectric ceramic layers 1 and internal electrode layers 2 are stacked; (b) a first side surface 14a and a second side surface 14b facing each other in a width direction W orthogonal to both stacking direction T and a direction in which internal electrode layers 2 extend to reach the surface of multilayer body 3 (i.e., a length direction L described below); and (c) a first end surface 15a and a second end surface 15b facing each other in length direction L orthogonal to both stacking direction T and width direction W.

Internal electrode layers 2 include: a first internal electrode layer 2a extending to reach first end surface 15a of multilayer body 3; and a second internal electrode layer 2b extending to reach second end surface 15b of multilayer body 3.

Furthermore, a first external electrode 4a of external electrode 4 is disposed on first end surface 15a so as to electrically conduct to first internal electrode layer 2a extending to reach first end surface 15a. Also, a second external electrode 4b is disposed on second end surface 15b so as to electrically conduct to second internal electrode layer 2b extending to reach second end surface 15b.

Specifically, first external electrode 4a is formed over the entire first end surface 15a of multilayer body 3 and formed so as to extend from first end surface 15a partially over first main surface 13a, second main surface 13b, first side surface 14a, and second side surface 14b.

Also, second external electrode 4b is formed over the entire second end surface 15b of multilayer body 3 and formed so as to extend from second end surface 15b partially over first main surface 13a, second main surface 13b, first side surface 14a, and second side surface 14b.

Multilayer ceramic capacitor 10 according to the present embodiment has dimensions including: a dimension in length direction L of about 0.35 mm; a dimension in width direction W of about 0.28 mm; a dimension in stacking direction T of about 0.28 mm; a thickness of about 0.5 μm in the dielectric ceramic layer; and a thickness of about 0.30 μm in the internal electrode layer.

Multilayer ceramic capacitor 10 according to the present embodiment is manufactured through a process of stacking a plurality of ceramic green sheets on which internal electrode patterns to be formed as internal electrode layers 2 after firing are respectively disposed.

Each ceramic green sheet having an internal electrode pattern disposed thereon is formed as a ceramic green sheet 1a having no level difference on ceramic green sheet 11 between a region where internal electrode pattern 12 to be formed as internal electrode layer 2 after firing is formed and a region where no internal electrode pattern 12 is formed (see FIG. 6B), as will be described below.

Figure 6A:
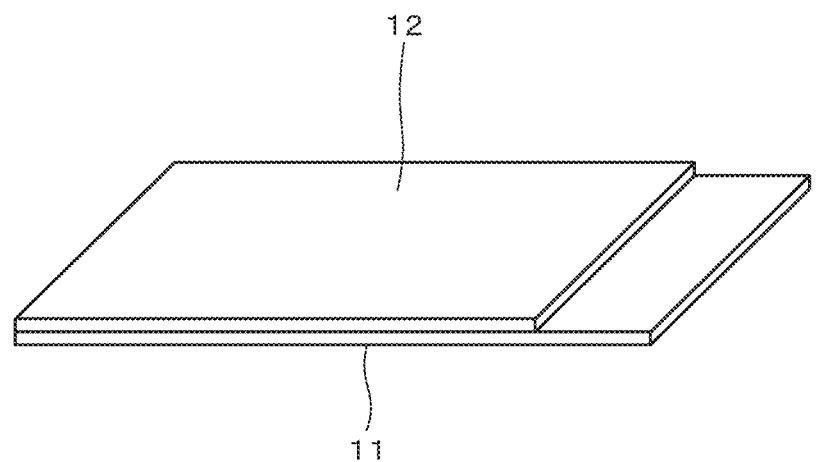
FIG. 6A is a diagram illustrating a method of fabricating a zero level difference sheet used to manufacture the multilayer ceramic capacitor according to the embodiment of the present invention.
Figure 6B:
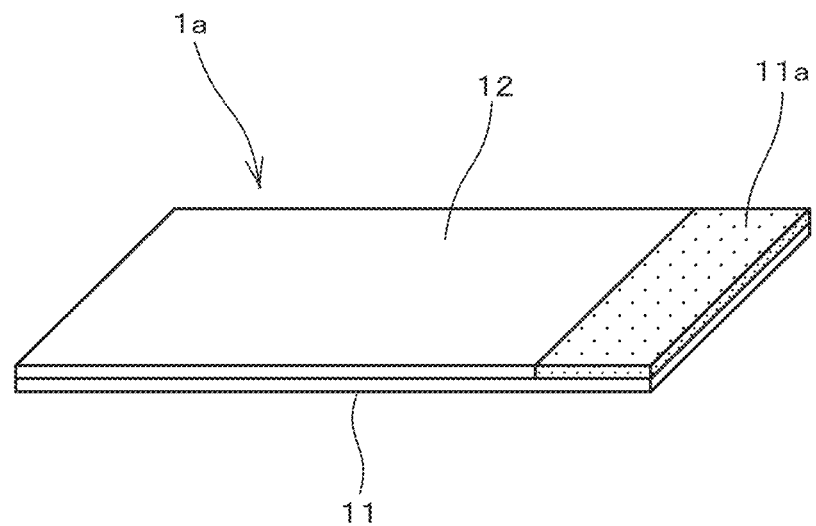
FIG. 6B is a diagram illustrating the method of fabricating the zero level difference sheet used to manufacture the multilayer ceramic capacitor according to the embodiment of the present invention.

More specifically, in the present embodiment, as shown in FIG. 6A, a conductive paste for internal electrode layer is applied onto ceramic green sheet 11 to thereby form internal electrode pattern 12. Then, as shown in FIG. 6B, a ceramic paste layer 11a is formed on a region where no internal electrode pattern 12 is formed, to thereby fabricate a ceramic green sheet having no level difference between a region where internal electrode pattern 12 is formed and a region where no internal electrode pattern 12 is formed, i.e., fabricate a zero level difference sheet 1a.

Figure 7:
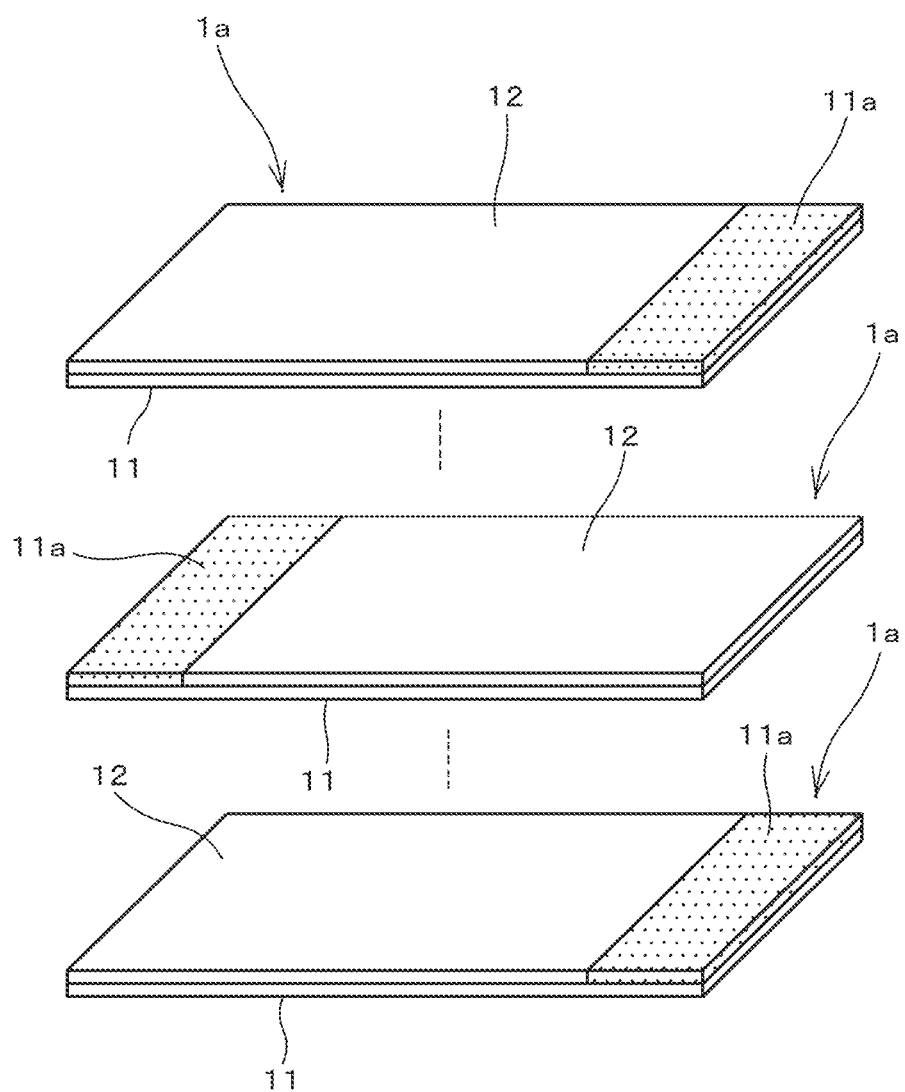
FIG. 7 is a diagram showing one step in a method of manufacturing a multilayer ceramic capacitor according to one embodiment of the present invention.

Then, as shown in FIG. 7, a prescribed number of zero level difference sheets 1a are stacked in such a manner that internal electrode patterns 12 to be formed as internal electrode layers after firing extend to reach the opposite sides alternately.

Figure 8:
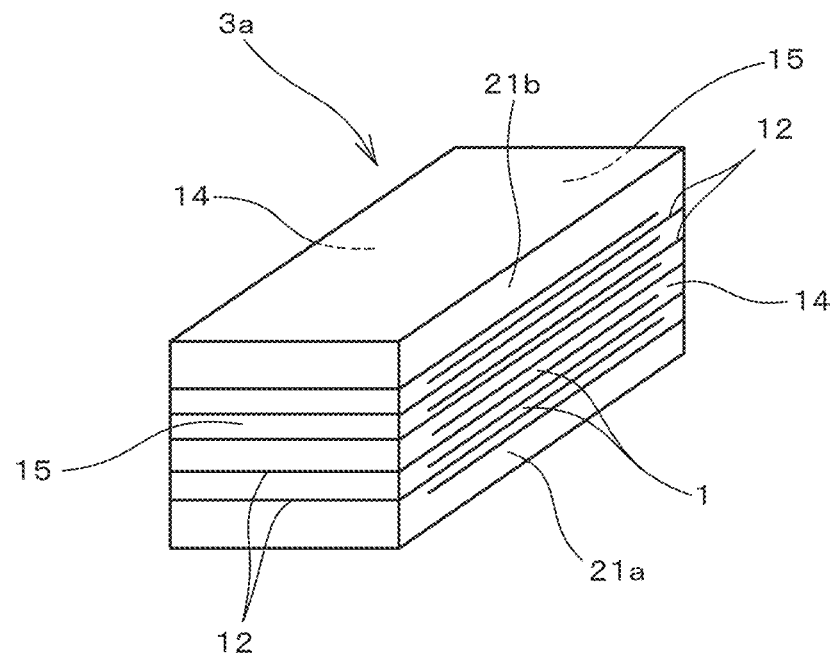
FIG. 8 is a diagram showing another step in the method of manufacturing a multilayer ceramic capacitor according to one embodiment of the present invention.

A multilayer body is formed specifically by: stacking a prescribed number of ceramic green sheets 21a each having no internal electrode pattern formed thereon and used for forming a main surface outer layer portion on the lower side; stacking a prescribed number of the above-mentioned zero level difference sheets 1a each having internal electrode pattern 12 formed thereon; stacking a prescribed number of ceramic green sheets 21b each having no internal electrode pattern formed thereon and used for forming a main surface outer layer portion on the upper side; and then press-fitting the resultant stack. Thus, an unfired multilayer body 3a is fabricated that has a structure in which internal electrode patterns 12 extend to reach facing end surfaces 15 alternately, and in which internal electrode patterns 12 are exposed also on facing side surfaces 14, as shown in FIG. 8.

Figure 9:
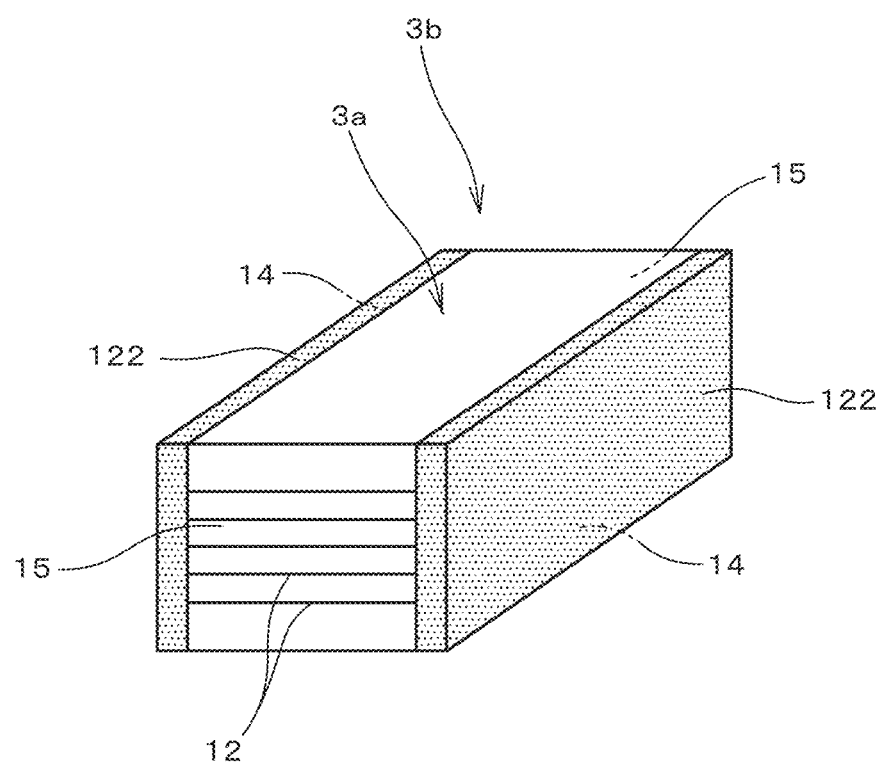
FIG. 9 is a diagram showing another step in the method of manufacturing a multilayer ceramic capacitor according to one embodiment of the present invention.

Then, as shown in FIG. 9, an unfired and coated multilayer body 3b is obtained by attaching a ceramic green sheet 122 to each of facing side surfaces 14 (FIG. 8) of unfired multilayer body 3a, through which internal electrode patterns 12 are exposed, so as to place ceramic green sheet 122 to cover these side surfaces 14 (FIG. 8) through which internal electrode patterns 12 are exposed.

Then, unfired and coated multilayer body 3b is fired to obtain a fired multilayer body 3. Then, as shown in FIGS. 1 and 2, first external electrode 4a and second external electrode 4b are formed on first end surface 15a and second end surface 15b, respectively, of multilayer body 3 so as to electrically conduct to internal electrode layers 2 (2a, 2b) exposed on first end surface 15a and second end surface 15b, respectively, of multilayer body 3. Thus, multilayer ceramic capacitor 10 is obtained.

In addition to the method of forming one multilayer body 3 described in the present embodiment, for example, a so-called multi-piece forming method may be used to manufacture individual multilayer bodies by separately dividing a mother multilayer body, as will be described below.

First, a mother multilayer body is formed by stacking, in a prescribed manner: a prescribed number of mother green sheets used for forming an outer layer portion on the lower side and having no internal electrode pattern formed thereon; a prescribed number of mother green sheets having strip-shaped mother internal electrode patterns respectively formed thereon that are to be formed as internal electrodes for multilayer bodies; and a prescribed number of mother green sheets used for forming an outer layer portion on the upper side and having no internal electrode pattern formed thereon.

Then, the obtained mother multilayer body is divided at prescribed positions to thereby fabricate an unfired multilayer body 3a having a structure in which internal electrode patterns 12 extend to reach facing end surfaces 15 alternately, and in which internal electrode patterns 12 are exposed also on facing side surfaces 14, as shown in FIG. 8.

Then, as shown in FIG. 9, ceramic green sheet 122 is attached to each of facing side surfaces 14 of unfired multilayer body 3a, which is then fired to thereby form a fired multilayer body. Then the external electrodes are formed on the end surfaces 15, with the result that a plurality of multilayer ceramic capacitors are then fabricated.

According to the above-mentioned method, when the mother multilayer body is divided at prescribed positions, the strip-shaped mother internal electrode pattern is cut at a plurality of prescribed positions in the direction orthogonal to the longitudinal direction, thereby forming individual unfired multilayer bodies 3a in which internal electrode patterns 12 are exposed also on the side surfaces, as shown in FIG. 8.

Multilayer ceramic capacitors are generally manufactured by such a multi-piece forming method. The multilayer ceramic capacitor of the present invention can also be manufactured efficiently by this multi-piece forming method.

Figure 3:
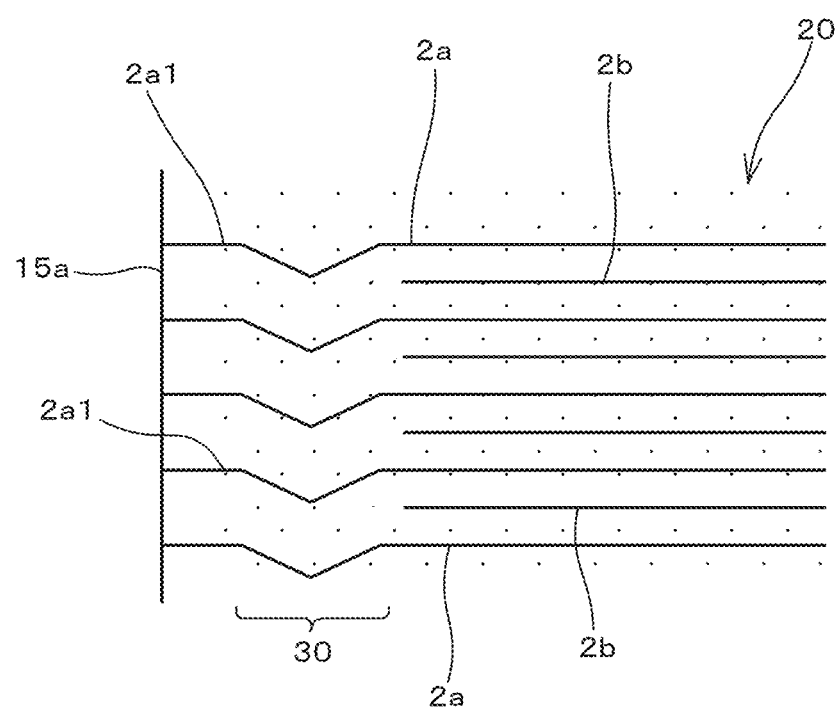
FIG. 3 is a diagram schematically showing the state of internal electrode layers in the multilayer ceramic capacitor according to one embodiment of the present invention.

In multilayer ceramic capacitor 10 according to the present embodiment, multilayer body 3 is formed using ceramic green sheet (zero level difference sheet) 1a having no level difference on ceramic green sheet 11 between a region where the internal electrode pattern 12 is formed (and converted into internal electrode layer 2 after firing) and a region where no internal electrode pattern 12 is formed, as described above. In this case, as schematically shown in FIG. 3, a bent portion 30 is formed in an extending portion 2a1 of first internal electrode layer 2a that extends to reach first end surface 15a. Although the reason why such bent portion 30 is formed is unclear, it is presumed that bent portion 30 as mentioned above is formed in the press-fitting step due to distortion or the like caused by a gap or the like formed among internal electrode pattern 12 in FIG. 6B, the region where internal electrode pattern 12 is formed, the region where no internal electrode pattern is formed, and ceramic paste layer 11a for eliminating a level difference therearound. In a conventional multilayer ceramic capacitor not having the configuration of the present invention (described later), this bent portion 30 causes structural defects, cracking and chipping, and a deterioration in high-temperature load reliability.

In multilayer ceramic capacitor 10 according to the present embodiment, a dielectric ceramic layer 1 in an effective portion 20 as a region where internal electrode layers 2 overlap with each other in a view seen in stacking direction T is made of a ceramic material containing Ba, Ti, Mn, and a rare earth element. More specifically, dielectric ceramic layer 1 is made of a ceramic material containing: $BaTiO_3$ as a main component; Mn; holmium (Ho) as a rare earth element; and V and Zr as minor components.

Although holmium (Ho) is used as a rare earth element in the present embodiment, other rare earth elements such as dysprosium (Dy), yttrium (Y), and lanthanoid other than holmium (Ho) can also be used alone or in combination, for example. However, in the present invention, it is particularly preferable to use holmium (Ho), dysprosium (Dy), and yttrium (Y) as rare earth elements.

Internal electrode layer 2 (i.e., first internal electrode layer 2a and second internal electrode layer 2b) is formed of metals such as Ni, Cu, Ag, Pd, Ti, Cr, and Au, or an alloy of these metals, for example. Internal electrode layer 2 may contain, as coexisting materials, dielectric ceramic particles having the same or similar composition as that of ceramic contained in dielectric ceramic layer 1.

In multilayer ceramic capacitor 10 according to the present embodiment, external electrode 4 (i.e., first external electrode 4a and second external electrode 4b) includes a first Ni layer 41 as an underlying electrode layer and a second Ni layer 42 as a plating layer formed on first Ni layer 41.

First Ni layer 41 constituting external electrode 4 is formed, for example, by applying and baking a conductive paste formed of glass and containing Ni as a main conductive component.

Second Ni layer 42 constituting external electrode 4 is formed by applying Ni plating onto the surface of first Ni layer 41 as an underlying electrode layer.

External electrode 4 is configured to include first Ni layer 41 that is a baked electrode as an underlying electrode and second Ni layer 42 as a plating layer on the surface of first Ni layer 41, thereby allowing fabrication of a highly reliable multilayer ceramic capacitor including an external electrode that is bonded to multilayer body 3 with high strength and that has a dense surface to achieve excellent moisture resistance.

Baking of the conductive paste during formation of first Ni layer 41 may be performed simultaneously with firing of multilayer body 3. Also, after firing of multilayer body 3, a conductive paste may be applied to multilayer body 3, which may then be baked.

First Ni layer 41 as an underlying electrode layer contains, as a coexisting material, dielectric ceramic particles (dielectric composition particles) having the same or similar composition as that of the dielectric ceramic constituting dielectric ceramic layer 1 (a dielectric composition constituting dielectric ceramic) in a ratio of 25% by area to 40% by area.

When first Ni layer 41 as an underlying electrode layer contains a coexisting material in a ratio of 25% to 40% by area in this way, physical properties such as an expansion coefficient of the external electrode can be brought close to those of the multilayer body. Thus, occurrence of defects such as cracks can be suppressed and the reliability can be improved. However, an excessively high content ratio of the coexisting material may decrease the electrical conductivity. Accordingly, it is desirable that the content ratio of the coexisting material does not exceed 40% by area.

The materials forming external electrode 4 and the method of forming external electrode 4 are not limited to the above-described examples, and external electrode 4 can be formed by various known methods using various materials used for forming electrodes.

Alternatively, an Sn layer may be formed by Sn plating on second Ni layer 42 or a solder plating layer may be formed by solder plating on second Ni layer 42, thereby also allowing improvement in solderability of external electrode 4.

Figure 4:
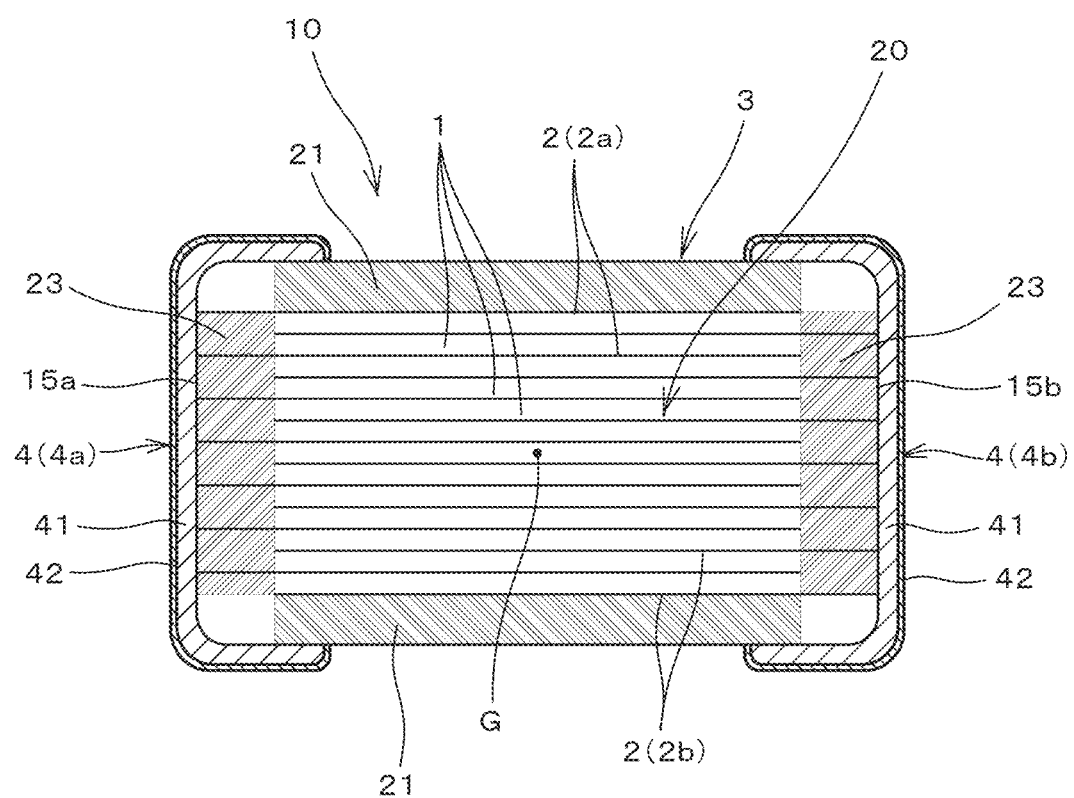
FIG. 4 is a diagram illustrating positions of main surface outer layer portions and end surface outer layer portions of the multilayer ceramic capacitor according to one embodiment of the present invention.
Figure 5:
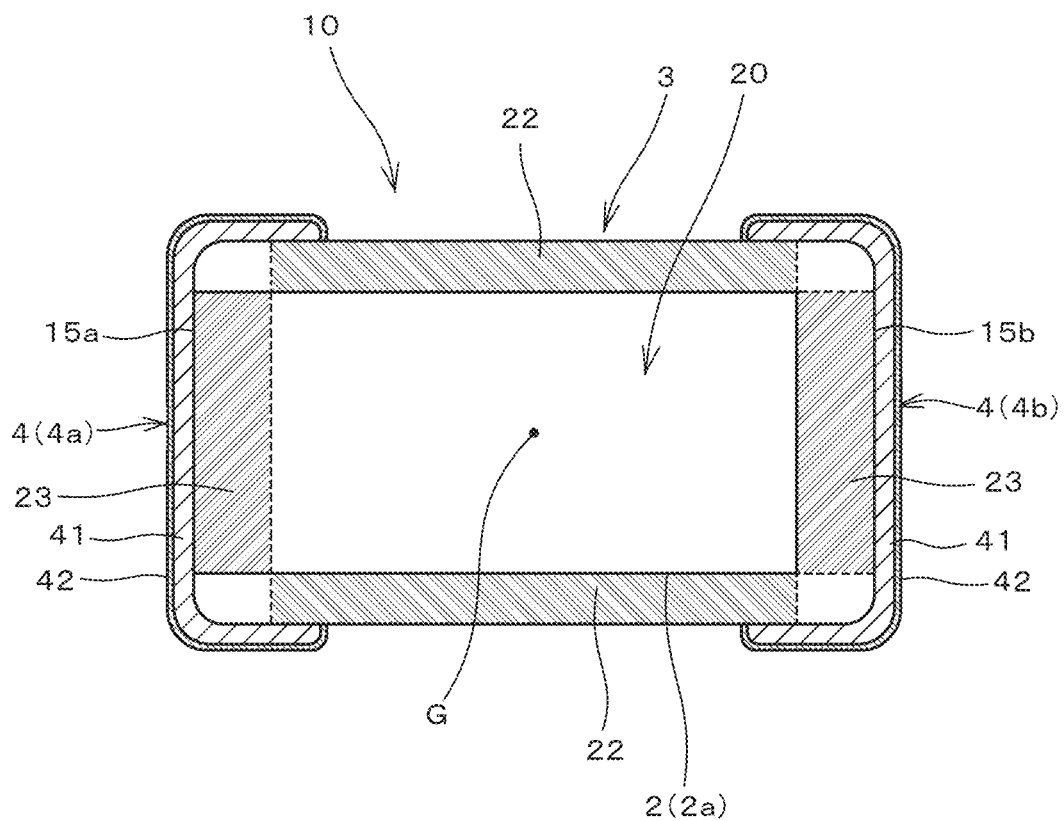
FIG. 5 is a diagram illustrating positions of side surface outer layer portions and end surface outer layer portions of the multilayer ceramic capacitor according to one embodiment of the present invention.

In samples of Examples 1 to 34 that each are multilayer ceramic capacitor 10 according to the embodiment of the present invention shown in the following Table 1, a region where internal electrode layers 2 overlap with each other in stacking direction T is defined as effective portion 20, each of regions sandwiching effective portion 20 in stacking direction T is defined as a main surface outer layer portion 21, each of regions sandwiching effective portion 20 in width direction W is defined as a side surface outer layer portion 22, and each of regions sandwiching effective portion 20 in length direction L is defined as an end surface outer layer portion 23, as shown in FIGS. 4 and 5. In this case, assuming that a ratio of a peak intensity of Mn by laser ICP to a peak intensity of Ti by laser ICP is defined as an Mn/Ti peak intensity ratio, a value of the Mn/Ti peak intensity ratio in the dielectric ceramic layer in at least one of main surface outer layer portion 21, side surface outer layer portion 22, and end surface outer layer portion 23 is in a range of two times to fifteen times the value of the Mn/Ti peak intensity ratio in the dielectric ceramic layer in a central portion of effective portion 20 in width direction W, length direction L, and stacking direction T.

An applicable method for increasing the value of the Mn/Ti peak intensity ratio in the dielectric ceramic layer in at least one of main surface outer layer portion 21, side surface outer layer portion 22, and end surface outer layer portion 23 in a range of two times to fifteen times the value of the Mn/Ti peak intensity ratio in the dielectric ceramic layer in the central portion of effective portion 20 may include, for example, a method of using ceramic green sheets, as dielectric ceramic layers forming a main surface outer layer portion or as dielectric ceramic layers forming side surface outer layer portion 22, that are higher in ratio of Mn to Ti than the dielectric ceramic layers used for forming an effective portion.

Furthermore, as an alternatively applicable method, a paste, powder or the like containing Mn as a main component may be applied onto the outside of the dielectric ceramic layer constituting main surface outer layer portion 21 or the outside of the dielectric ceramic layer constituting side surface outer layer portion 22, and firmly adhered to the chip surface, and then diffused during degreasing and firing.

Furthermore, in the samples of Examples 18 to 34 among the samples of Examples 1 to 34 in Table 1 that are fabricated in the present embodiment, assuming that a ratio of the peak intensity of Ho (a rare earth element) by laser ICP to the peak intensity of Ti by laser ICP is defined as a Ho (rare earth element)/Ti peak intensity ratio, the value of the Ho (rare earth element)/Ti peak intensity ratio in the dielectric ceramic layer in at least one of main surface outer layer portion 21, side surface outer layer portion 22, and end surface outer layer portion 23 is set to be higher than the value of the Ho (rare earth element)/Ti peak intensity ratio in the dielectric ceramic layer in the central portion in effective portion 20.

Examples of an applicable method for increasing the values of the Ho (rare earth element)/Ti peak intensity ratios in the dielectric ceramic layers in main surface outer layer portion 21, side surface outer layer portion 22, and end surface outer layer portion 23 in a range of two times to fifteen times the value of the Ho (rare earth element) peak intensity ratio in the dielectric ceramic layer in the central portion of effective portion 20 may include a method of using ceramic green sheets, as dielectric ceramic layers constituting the main surface outer layer portion or as dielectric ceramic layers constituting side surface outer layer portion 22, that are higher in ratio of Ho (a rare earth element) to Ti than the dielectric ceramic layers used for forming an effective portion.

Furthermore, as an alternatively applicable method, a paste or powder containing Ho (a rare earth element) as a main component may be applied onto the outside of the dielectric ceramic layer constituting main surface outer layer portion 21 or the outside of the dielectric ceramic layer constituting side surface outer layer portion 22, and firmly adhered to the chip surface, and then, diffused during degreasing and firing.

With regard to the multilayer ceramic capacitors in Examples 1 to 34 fulfilling the requirements of the present invention, and the multilayer ceramic capacitors in Comparative Examples 1 to 5 not fulfilling the requirements of the present invention, each of which is fabricated in the present embodiment, Table 1 shows: the value of the Mn/Ti peak intensity ratio as a ratio of the peak intensity of Mn by laser ICP (laser atomic emission spectroscopy) to the peak intensity of Ti by laser ICP in each of the effective portion, the main surface outer layer portion, the end surface outer layer portion, and the side surface outer layer portion in each of the above-mentioned multilayer ceramic capacitors in Examples 1 to 34 and Comparative Examples 1 to 5; and the value of the Ho/Ti peak intensity ratio as a ratio of the peak intensity of Ho by laser ICP to the peak intensity of Ti by laser ICP in each of the effective portion, the main surface outer layer portion, the end surface outer layer portion, and the side surface outer layer portion in each of the above-mentioned multilayer ceramic capacitors in Examples 1 to 34 and Comparative Examples 1 to 5.

TABLE 1

| | Mn/Ti Peak Intensity Ratio | | | | Ho/Ti Peak Intensity Ratio | | | | Structural Defects on Side Surface | Structural Defects on End Surface | Cracking and Chipping | | |
| --- | --- | --- | --- | --- | --- | --- | --- | --- | --- | --- | --- | --- | --- |
| | Effective Portion | Main Surface Outer Layer Portion | Side Surface Outer Layer Portion | End Surface Outer Layer Portion | Effective Portion | Main Surface Outer Layer Portion | Side Surface Outer Layer Portion | End Surface Outer Layer Portion | Side Number of Occurrences (N = 50) | Side Number of Occurrences (N = 50) | Number of Occurrences (N = 100) | Structural Defect Evaluation Result | MTTF 120° C. 6.3 V |
| Comparative Example 1 | 1 | 1 | 1 | 1 | 1 | 1 | 1 | 1 | 0 | 0 | 9 | Not Good | 21 |
| Example 1 | 1 | 2 | 1 | 1 | 1 | 1 | 1 | 1 | 0 | 0 | 1 | Good | 23 |
| Example 2 | 1 | 5 | 1 | 1 | 1 | 1 | 1 | 1 | 0 | 0 | 1 | Good | 25 |
| Example 3 | 1 | 10 | 1 | 1 | 1 | 1 | 1 | 1 | 0 | 0 | 1 | Good | 27 |
| Example 4 | 1 | 15 | 1 | 1 | 1 | 1 | 1 | 1 | 0 | 0 | 1 | Good | 27 |
| Comparative Example 2 | 1 | 20 | 1 | 1 | 1 | 1 | 1 | 1 | 12 | 12 | 13 | Not Good | 27 |
| Example 5 | 1 | 1 | 2 | 1 | 1 | 1 | 1 | 1 | 0 | 0 | 1 | Good | 27 |
| Example 6 | 1 | 1 | 5 | 1 | 1 | 1 | 1 | 1 | 0 | 0 | 1 | Good | 32 |
| Example 7 | 1 | 1 | 10 | 1 | 1 | 1 | 1 | 1 | 0 | 0 | 1 | Good | 36 |
| Example 8 | 1 | 1 | 15 | 1 | 1 | 1 | 1 | 1 | 0 | 0 | 1 | Good | 38 |
| Comparative Example 3 | 1 | 1 | 20 | 1 | 1 | 1 | 1 | 1 | 16 | 0 | 18 | Not Good | 38 |
| Example 9 | 1 | 1 | 1 | 2 | 1 | 1 | 1 | 1 | 0 | 0 | 1 | Good | 25 |
| Example 10 | 1 | 1 | 1 | 4 | 1 | 1 | 1 | 1 | 0 | 0 | 1 | Good | 27 |
| Example 11 | 1 | 1 | 1 | 7 | 1 | 1 | 1 | 1 | 0 | 0 | 1 | Good | 32 |
| Example 12 | 1 | 1 | 1 | 10 | 1 | 1 | 1 | 1 | 0 | 0 | 1 | Good | 36 |
| Example 13 | 1 | 1 | 1 | 13 | 1 | 1 | 1 | 1 | 0 | 0 | 1 | Good | 36 |
| Comparative Example 4 | 1 | 1 | 1 | 20 | 1 | 1 | 1 | 1 | 0 | 13 | 17 | Not Good | 36 |
| Example 14 | 1 | 2 | 2 | 2 | 1 | 1 | 1 | 1 | 0 | 0 | 1 | Good | 29 |
| Example 15 | 1 | 5 | 5 | 4 | 1 | 1 | 1 | 1 | 0 | 0 | 1 | Good | 36 |
| Example 16 | 1 | 10 | 10 | 7 | 1 | 1 | 1 | 1 | 0 | 0 | 1 | Good | 46 |
| Example 17 | 1 | 15 | 15 | 10 | 1 | 1 | 1 | 1 | 0 | 0 | 1 | Good | 42 |
| Comparative Example 5 | 1 | 30 | 30 | 20 | 1 | 1 | 1 | 1 | 21 | 14 | 29 | Not Good | 42 |
| Example 18 | 1 | 10 | 10 | 7 | 1 | 2 | 1 | 1 | 0 | 0 | 0 | Good | 45 |
| Example 19 | 1 | 10 | 10 | 7 | 1 | 5 | 1 | 1 | 0 | 0 | 0 | Good | 47 |
| Example 20 | 1 | 10 | 10 | 7 | 1 | 7 | 1 | 1 | 0 | 0 | 0 | Good | 47 |
| Example 21 | 1 | 10 | 10 | 7 | 1 | 10 | 1 | 1 | 1 | 1 | 1 | Good | 47 |
| Example 22 | 1 | 10 | 10 | 7 | 1 | 1 | 2 | 1 | 0 | 0 | 0 | Good | 44 |
| Example 23 | 1 | 10 | 10 | 7 | 1 | 1 | 5 | 1 | 0 | 0 | 0 | Good | 46 |
| Example 24 | 1 | 10 | 10 | 7 | 1 | 1 | 7 | 1 | 0 | 0 | 0 | Good | 46 |
| Example 25 | 1 | 10 | 10 | 7 | 1 | 1 | 10 | 1 | 1 | 0 | 1 | Good | 46 |
| Example 26 | 1 | 10 | 10 | 7 | 1 | 1 | 1 | 2 | 0 | 0 | 0 | Good | 43 |
| Example 27 | 1 | 10 | 10 | 7 | 1 | 1 | 1 | 4 | 0 | 0 | 0 | Good | 44 |
| Example 28 | 1 | 10 | 10 | 7 | 1 | 1 | 1 | 5 | 0 | 0 | 0 | Good | 44 |
| Example 29 | 1 | 10 | 10 | 7 | 1 | 1 | 1 | 7 | 0 | 0 | 0 | Good | 44 |
| Example 30 | 1 | 10 | 10 | 7 | 1 | 1 | 1 | 10 | 0 | 1 | 1 | Good | 45 |
| Example 31 | 1 | 10 | 10 | 7 | 1 | 2 | 2 | 2 | 0 | 0 | 0 | Good | 50 |
| Example 32 | 1 | 10 | 10 | 7 | 1 | 5 | 5 | 4 | 0 | 0 | 0 | Good | 50 |
| Example 33 | 1 | 10 | 10 | 7 | 1 | 7 | 7 | 5 | 0 | 0 | 0 | Good | 50 |
| Example 34 | 1 | 10 | 10 | 7 | 1 | 7 | 7 | 10 | 0 | 0 | 1 | Good | 48 |

The peak intensity ratio in Table 1 was obtained by the method described below.

First, for obtaining the peak intensity ratio in effective portion 20, multilayer ceramic capacitor 10 was cut at a central part G (see FIGS. 2, 4, and 5) in length direction L along width direction W and stacking direction T to expose the cross section of effective portion 20. The exposed cross section was then analyzed by laser ICP. The spot diameter (irradiation diameter) of laser ICP was set at about 15 μm. The effective portion was analyzed at each of three points in the upper, intermediate, and lower portions in the stacking direction, to obtain an average value of the peak intensities of each of Ti and Ho (a rare earth element).

Then, the respective average values of the peak intensities of each of Mn, Ti, and Ho (a rare earth element) obtained at the above-mentioned three points were used to calculate the Mn/Ti peak intensity ratio as a ratio of the peak intensity of Mn to the peak intensity of Ti, and the Ho/Ti peak intensity ratio as a ratio of the peak intensity of Ho (a rare earth element) to the peak intensity of Ti.

Furthermore, the peak intensities of Ti, Mn, and Ho in the dielectric ceramic layer in each of main surface outer layer portion 21, side surface outer layer portion 22, and end surface outer layer portion 23 were measured in each of main surface outer layer portion 21, side surface outer layer portion 22, and end surface outer layer portion 23 along the planes exposed by cutting multilayer ceramic capacitor 10 at central part G in length direction L (see FIGS. 2, 4, and 5) along width direction W and stacking direction T in the same manner as in the above-mentioned case of measuring the peak intensity in the effective portion.

It should be noted that the numerical values of the Mn/Ti peak intensity ratio and the Ho/Ti peak intensity ratio in a corresponding portion in each of the main surface outer layer portion, the side surface outer layer portion, and the end surface outer layer portion in Table 1 do not exactly show the values of the Mn/Ti peak intensity ratio and the Ho/Ti peak intensity ratio in each corresponding portion, but show the values obtained by normalizing the Mn/Ti peak intensity ratio and the Ho/Ti peak intensity ratio in each corresponding portion based on the Mn/Ti peak intensity ratio and the Ho/Ti peak intensity ratio in the effective portion each defined as 1.

Table 1 also shows the number of occurrences of structural defects on the side surface side and structural defects on the end surface side examined in each of 50 samples, the number of occurrences of cracking and chipping examined in each of 100 samples, and the mean time to failure (MTTF) in the high-temperature load reliability test performed in each of 30 samples.

The structural defects on the side surface side in Table 1 represent structural defects observed in a portion on the side surface side along a W-T plane defined in width direction W and stacking direction T, which is exposed by polishing multilayer body 3 from the end surface side to the central portion in length direction L.

The structural defects on the end surface side in Table 1 represent structural defects observed in a portion on the end surface side along an L-T plane defined in length direction L and stacking direction T, which is exposed by polishing multilayer body 3 from the side surface side to the central portion in width direction W.

The structural defects on the side surface side and the structural defects on the end surface side include, for example, delamination, cracking, and the like. In this case, based on delamination or cracking extending along a length equal to or more than the thickness of the dielectric ceramic layers constituting the effective portion, a sample recognized as having such delamination or cracking in the portion on the side surface side is defined as having structural defects on the side surface side, and also, a sample recognized as having such delamination or cracking in the portion on the end surface side is defined as having structural defects on the end surface side.

Table 1 shows the number of samples recognized as having structural defects as a result of observation of 50 samples for checking both the structural defects on the side surface side and the structural defects on the end surface side.

Cracking and chipping in Table 1 mean a defect having a maximum diameter of 50 μm or more and visually recognized from outside (an external structure defect). Table 1 also shows the number of samples recognized as having any defect having a maximum diameter of 50 μm or more as a result of the examination for checking the external appearances of 100 samples.

The structural defect evaluation result in Table 1 includes ratings of "Good" and "Not Good." The rating of "Good" is for: a sample having none of three types of defects that include structural defects on the side surface side, structural defects on the end surface side, and cracking and chipping (external structural defects); and a sample having less than two defects for each of the above-mentioned three types of defects. The rating of "Not Good" is for a sample having two or more defects for at least one type of defect among the above-mentioned three types of defects.

The mean time to failure (MTTF) as an index for determining the high-temperature load reliability is a mean value of the time periods elapsing after application of a voltage of 6.3 V to 30 samples in an atmosphere at a high temperature of 120° C. until occurrence of failures such as a short circuit or insulation resistance deterioration. When the mean time to failure (MTTF) is shorter than a prescribed time, the high-temperature load reliability is determined as "Not Good."

For example, when the dielectric ceramic layer is designed to have a thickness of 0.5 μm, the prescribed time is set at 25 hours. When the dielectric ceramic layer is designed to have a thickness of 0.4 μm, the prescribed time is set at 20 hours. In the present embodiment, the dielectric ceramic layer has a thickness of about 0.5 μm. Thus, when the MTTF was less than 23 hours, the high-temperature load reliability was evaluated as "Not Good."

As shown in Table 1, in each of the samples of Examples 1 to 34 fulfilling the requirement that the value of the Mn/Ti peak intensity ratio in the dielectric ceramic layer in any one of the main surface outer layer portion, the side surface outer layer portion, and the end surface outer layer portion is in a range of two times to fifteen times the value of the Mn/Ti peak intensity ratio in the dielectric ceramic layer in the effective portion, the structural defect evaluation result was rated as "Good."

Also as to the high-temperature load reliability, in each of the samples of Examples 1 to 34, the MTTF was 23 hours or more, and the high-temperature load reliability was rated as "Good."

On the other hand, in each of the samples of Comparative Examples 1 to 5 not fulfilling the above-described requirement, the structural defect evaluation result was confirmed as "Not Good."

As to the high-temperature load reliability, in Comparative Example 1, the MTTF was 21 hours and the high-temperature load reliability was determined as "Not Good." In each of Comparative Examples 2 to 5, however, the MTTF was 23 hours or more, and the high-temperature load reliability was confirmed as "Good."

Among the samples of Examples 1 to 34 fulfilling the above-described requirement, in each of the samples of Examples 14 to 17 fulfilling the requirement that the value of the Mn/Ti peak intensity ratio in the dielectric ceramic layer in each of the main surface outer layer portion, the side surface outer layer portion, and the end surface outer layer portion was in a range of two times to fifteen times the value of the Mn/Ti peak intensity ratio in the dielectric ceramic layer in the effective portion, the structural defect evaluation result was determined as "Good," and the high-temperature load reliability was confirmed as "Good." It was recognized that the samples of Examples 16 and 17 particularly tend to be improved in high-temperature load reliability as compared with the samples of Examples 1 to 13 in which the value of the Mn/Ti peak intensity ratio in the dielectric ceramic layer in only one of the main surface outer layer portion, the side surface outer layer portion, and the end surface outer layer portion is in a range of two times to fifteen times the value of the Mn/Ti peak intensity ratio in the dielectric ceramic layer in the effective portion.

Furthermore, among the samples of Examples 1 to 34 fulfilling the requirements of the present invention for the Mn/Ti peak intensity ratio, in each of the samples of Examples 18 to 30 further fulfilling the requirement that the value of the Ho (rare earth element)/Ti peak intensity ratio in the dielectric ceramic layer in any one of the main surface outer layer portion, the side surface outer layer portion, and the end surface outer layer portion is in a range of two times or more and ten times or less the value of the Ho (rare earth element)/Ti peak intensity ratio in the dielectric ceramic layer in the effective portion, each structural defect evaluation result was rated as "Good", and the high-temperature load reliability was also recognized as having a tendency to improve.

Among the samples of Examples 18 to 30, in each of the samples of Examples 18 to 20, Examples 22 to 24, and Examples 26 to 29 in which the value of the Ho (rare earth element)/Ti peak intensity ratio in the dielectric ceramic layer in any one of the main surface outer layer portion, the side surface outer layer portion, and the end surface outer layer portion was in a range of two times to seven times the value of the Ho (rare earth element)/Ti peak intensity ratio in the dielectric ceramic layer in the effective portion, structural defects on the side surface side, structural defects on the end surface side, and cracking and chipping (external structural defects) were not observed. However, in each of the samples of Examples 21, 25, and 30 exhibiting a ten times higher Ho (rare earth element)/Ti peak intensity ratio, the number of occurrences of defects was as small as less than two, but structural defects on the side surface side, structural defects on the end surface side, and cracking and chipping (external structural defects) were observed. However, also in each of the samples of Examples 21, 25, and 30 exhibiting a ten times higher Ho (rare earth element)/Ti peak intensity ratio, the structural defect evaluation result was rated as "Good."

Therefore, the multilayer ceramic capacitor of the present invention is configured such that the value of the Ho (rare earth element)/Ti peak intensity ratio in the dielectric ceramic layer in any one of the main surface outer layer portion, the side surface outer layer portion, and the end surface outer layer portion is preferably in a range of two times to ten times, and more preferably in a range of two times to seven times, the value of the Ho (rare earth element)/Ti peak intensity ratio in the dielectric ceramic layer in the effective portion.

Furthermore, in each of the samples of Examples 31 to 33 in which the value of the Ho (rare earth element)/Ti peak intensity ratio in the dielectric ceramic layer in each of the main surface outer layer portion, the side surface outer layer portion, and the end surface outer layer portion is in a range of two times to seven times the value of the Ho (rare earth element)/Ti peak intensity ratio in the dielectric ceramic layer in the effective portion, the structural defect evaluation result was rated as "Good," and the MTTF was 50 hours, so that the high-temperature load reliability was confirmed to achieve a particularly good result. However, in the case of the sample of Example 34 fulfilling the same conditions as those of the sample of Example 33 except for the condition that the value of the Ho (rare earth element)/Ti peak intensity ratio in the dielectric ceramic layer in the end surface outer layer portion was 10 times as high as the value of the Ho (rare earth element)/Ti peak intensity ratio in the dielectric ceramic layer in the effective portion, the structural defect evaluation result and the high-temperature load reliability each were rated as "Good," but the MTTF was 48 hours, so that it was confirmed that the high-temperature load reliability was slightly inferior to those of the samples of Examples 31 to 33 for which the MTTF was 50 hours.

Therefore, it is recognized that the values of the Ho (rare earth element)/Ti peak intensity ratios in the dielectric ceramic layers in the main surface outer layer portion, the side surface outer layer portion, and the end surface outer layer portion are preferably in a range of two times to ten times, and more preferably in a range of two times to seven times, the value of the Ho (rare earth element)/Ti peak intensity ratio in the dielectric ceramic layer in the effective portion.

It is unclear why structural defects, and cracking and chipping are less likely to occur in the multilayer body and the high-temperature load reliability is improved when the value of the Mn/Ti peak intensity ratio in the dielectric ceramic layer in at least one of the main surface outer layer portion, the side surface outer layer portion, and the end surface outer layer portion is in a range of two times to fifteen times the value of the Mn/Ti peak intensity ratio in the dielectric ceramic layer in the central portion of the effective portion as described above. The following reasons are however conceivable.

(a) Diffusion of Mn is promoted to thereby increase the ratio of Mn in the end portions of the internal electrode layer in the width direction and the length direction, the grain growth of ceramic constituting the dielectric ceramic layer is suppressed, and the element smoothness is also improved, with the result that the high-temperature load reliability is improved.

(b) The grain growth of ceramic constituting the dielectric ceramic layer is suppressed, and the grain size is reduced to thereby increase the grain boundary, and thus, any external impact is readily absorbed, with the result that occurrence of cracking and chipping is reduced, and the incidence of structural defects is reduced.

The above describes a feature that the values of the Mn/Ti peak intensity ratios in the dielectric ceramic layers in the main surface outer layer portion, the side surface outer layer portion, and the end surface outer layer portion are in a range of two times to fifteen times the value of the Mn/Ti peak intensity ratio in the dielectric ceramic layer in the effective portion. This feature is described interchangeably as that the ratios of Mn to Ti in the dielectric ceramic layers in the main surface outer layer portion, the side surface outer layer portion, and the end surface outer layer portion are set higher than the ratio of Mn to Ti in the dielectric ceramic layer in the effective portion. The ratio of Mn to Ti can be represented by a molar ratio, for example.

It is not necessarily clear why the high-temperature load reliability is improved by adjusting the values of the Ho (rare earth element)/Ti peak intensity ratios in the dielectric ceramic layers in the main surface outer layer portion, the side surface outer layer portion, and the end surface outer layer portion to fall within a range of two times to 10 times the value of the Ho (rare earth element)/Ti peak intensity ratio in the dielectric ceramic layer in the effective portion. However, it is conceivable that diffusion of Mn or Ho from the outer layer portion to the inner layer improves the insulation property of ceramic in the inner layer, thereby improving the reliability at the end portion of the electrode where the electric field concentrates.

It should be noted that the above-mentioned range is desirable since merely increasing the ratio of Mn or a rare earth element such as Ho to Ti causes sintering mismatch to thereby produce structural defects.

In the multilayer ceramic capacitor of the present invention, when the content ratios of Mn and a rare earth element in the dielectric ceramic layer in each of the main surface outer layer portion, the side surface outer layer portion, the end surface outer layer portion, and the effective portion are set such that Mn is more than 0 mol % and less than 5 mol % and the rare earth element is 0.1 mol % or more and less than 15 mol %, then, the Mn/Ti peak intensity ratio and the rare earth element/Ti peak intensity ratio are desirably set at respective values as defined in the present invention.

Furthermore, in the above-described embodiment, the dielectric ceramic layers are made of ceramic containing $BaTiO_3$ as a main component, and thereby, the content of Ti in each dielectric ceramic layer is about 20 mol %. Thus, in the case where Ti is contained in such a ratio, Mn and a rare earth element are set to be contained at prescribed sites so as to respectively achieve the Mn/Ti peak intensity ratio and the rare earth element/Ti peak intensity ratio as described above, with the result that the functions and effect of the present invention can be achieved.

Figure 10A:
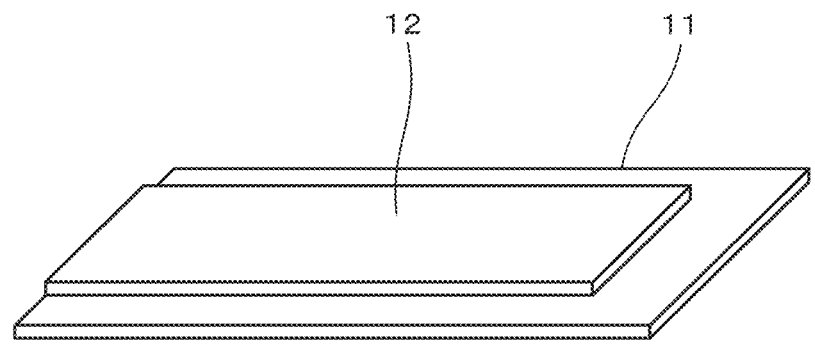
FIG. 10A is a diagram illustrating a method of fabricating a zero level difference sheet according to a modification.
Figure 10B:
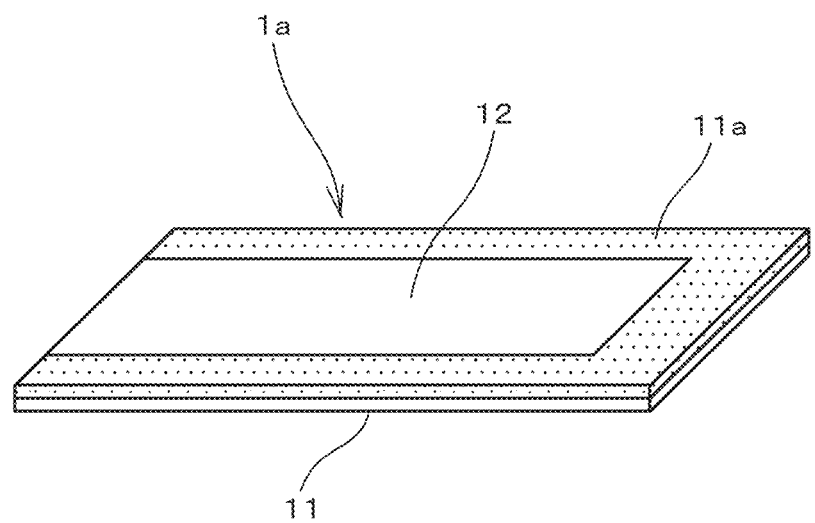
FIG. 10B is a diagram illustrating a method of fabricating a zero level difference sheet according to a modification.

Zero level difference sheet 1a used in the above-described embodiment is obtained by forming ceramic paste layer 11a on a region having no internal electrode pattern 12 formed thereon (i.e., a region on one end side of ceramic green sheet 11 in the longitudinal direction), thereby forming a ceramic green sheet having no level difference between a region having internal electrode pattern 12 formed thereon and a region having no internal electrode pattern 12 formed thereon (i.e., the above-mentioned so-called zero level difference sheet 1a), as shown in FIG. 6B. In contrast, for example, as shown in FIGS. 10A and 10B, ceramic paste layer 11a is disposed around internal electrode pattern 12 formed on the surface of ceramic green sheet 11 in such a manner that only one side of internal electrode pattern 12 extends to reach the end portion of ceramic green sheet 11, to thereby form zero level difference sheet 1a configured such that no level difference exists between the region having internal electrode pattern 12 formed thereon and the region formed therearound and having no internal electrode pattern 12 formed thereon. Zero level difference sheet 1a formed in this way can also be used. When zero level difference sheet 1a shown in FIGS. 10A and 10B is used, no internal electrode pattern is exposed on the side surface of the obtained multilayer body, thereby eliminating the need to affix a ceramic sheet onto the side surface of the multilayer body.

Also in the case where zero level difference sheet 1a shown in FIGS. 10A and 10B is used, a so-called multi-piece forming method is applicable, by which a mother multilayer body is formed by using a mother green sheet having a plurality of internal electrode patterns formed thereon in matrix form, and cut at prescribed positions, and then, divided into individual multilayer bodies. In this case, no internal electrode pattern is exposed on the side surfaces of the obtained individual multilayer bodies, which eliminates the need to affix ceramic sheets onto the side surfaces of the multilayer bodies, as described above.

In addition, not only when the present invention is applied to a multilayer ceramic capacitor formed using the above-described so-called zero level difference sheet, but also when the present invention is applied to a multilayer ceramic capacitor manufactured using a ceramic green sheet having a level difference between a region having an internal electrode pattern formed thereon and a region having no internal electrode pattern formed thereon (i.e., a ceramic green sheet on which no ceramic paste layer for level difference elimination is formed), occurrence of cracking and chipping may be able to be suppressed, and the high-temperature load reliability may be able to be improved.

Then, the dimensions of each of portions of the multilayer ceramic capacitor to which the present invention is preferably applicable will be described.

The preferable dimensions of the multilayer ceramic capacitor will be hereinafter described by way of example.

<Dimensions of Each of Portions of Multilayer Ceramic Capacitor>

(Type 1)
Dimension in length direction L: 0.32 mm to 0.36 mm
Dimension in width direction W: 0.25 mm to 0.30 mm
Dimension in stacking direction T: 0.25 mm to 0.30 mm
Thickness of dielectric ceramic layer: 0.35 µm to 0.6 µm
Thickness of internal electrode layer: 0.30 µm to 0.4 µm The thickness of the dielectric ceramic layer and the thickness of the internal electrode layer show an average thickness of the dielectric ceramic layers and an average thickness the internal electrode layers, respectively, in the effective portion.

(Type 2)
Dimension in length direction L: 0.1 mm to 0.12 mm
Dimension in width direction W: 0.63 mm to 0.68 mm
Dimension in stacking direction T: 0.62 mm to 0.68 mm
Thickness of dielectric ceramic layer: 0.35 µm to 0.6 µm
Thickness of internal electrode layer: 0.30 µm to 0.4 µm The thickness of the dielectric ceramic layer and the thickness of the internal electrode layer show an average thickness of the dielectric ceramic layers and an average thickness of the internal electrode layers, respectively, in the effective portion.

In the multilayer ceramic capacitor of the present invention, the thickness of the internal electrode layer is preferably 0.4 µm or less, and more preferably 0.3 µm or less, irrespective of the outer dimensions thereof.

The internal electrode layer having a thickness of 0.4 µm or less allows further thinning of layers, so that the capacity can be increased, and also, peeling off due to a shrinkage difference between the internal electrode and the dielectric layer can be prevented.

Although the internal electrode layer having a thickness of 0.3 µm or less can further reliably prevent peeling, the internal electrode layer having a thickness of 0.3 µm or more is usually desirable for the purpose of ensuring coverage of the internal electrode layer.

Furthermore, in the multilayer ceramic capacitor of the present invention, the thickness of the dielectric ceramic layer is preferably 0.6 µm or less. The dielectric ceramic layer having a thickness of 0.6 µm or less allows formation of a multilayer ceramic capacitor having a relatively large capacitance.

However, for the purpose of preventing a short circuit between internal electrode layers and a deterioration in high-temperature load reliability, it is usually preferable that the dielectric ceramic layer has a thickness of 0.1 µm or more.

<Method of Measuring Thicknesses of Dielectric Ceramic Layer and Internal Electrode Layer>

Then, a method of measuring thicknesses of the dielectric ceramic layer and the internal electrode layer will be described.

Figure 11:
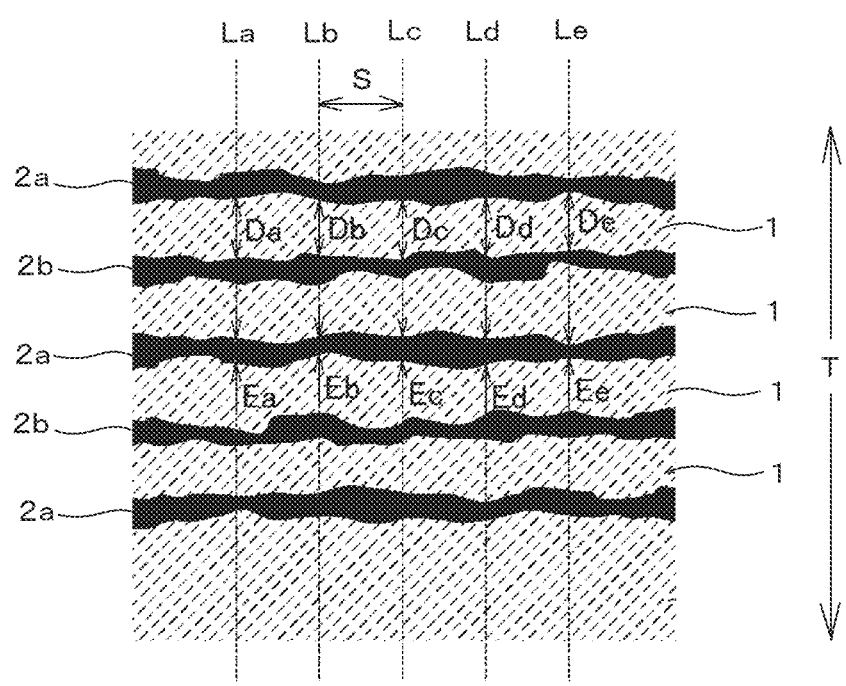
FIG. 11 is a diagram illustrating a method of measuring thicknesses of dielectric ceramic layers and internal electrode layers.

For example, when measuring the thickness of the dielectric ceramic layer, a plurality of straight lines La, Lb, Lc, Ld, and a straight line Le were drawn at prescribed intervals S from each other, as shown in FIG. 11. Then, a thickness Da on straight line La, a thickness Db on straight line Lb, a thickness Dc on straight line Lc, a thickness Dd on straight line Ld, and a thickness De on straight line Le were measured and averaged to obtain an average value thereof, which was defined as a thickness of the dielectric ceramic layer.

Similarly, when measuring the thickness of the internal electrode layer, a thickness Ea on straight line La, a thickness Eb on straight line Lb, a thickness Ec on straight line Lc, a thickness Ed on straight line Ld, and a thickness Ee on straight line Le shown in FIG. 11 were measured and averaged to obtain an average value thereof, which was defined as a thickness of the internal electrode layer.

For example, when calculating the average thickness of the plurality of dielectric ceramic layers, the above-mentioned method was used to measure the thicknesses of five dielectric ceramic layers including: a dielectric ceramic layer located substantially at the center in stacking direction T; and two dielectric ceramic layers located on each of both sides thereof. Then, the measured thicknesses were averaged to obtain an average value, which was defined as an average thickness of the plurality of dielectric ceramic layers. Also, when calculating the average thickness of the plurality of internal electrode layers, the above-mentioned method was used to measure the thicknesses of five internal electrode layers including: an internal electrode layer located substantially at the center in stacking direction T; and two internal electrode layers located on each of both sides thereof. Then, the measured thicknesses were averaged to obtain an average value, which was defined as an average thickness of the plurality of internal electrode layers. When the number of stacked dielectric ceramic layers (internal electrode layers) was less than five, the above-mentioned method was used to measure the thicknesses of all the dielectric ceramic layers and the internal electrode layers. Then, the measured thicknesses were averaged to obtain an average value, which was defined as an average thickness of the plurality of dielectric ceramic layers and the plurality of internal electrode layers.

<Method of Measuring Coexisting Material in External electrode>

The content of the ceramic material as a coexisting material in the first Ni layer as an underlying electrode layer (i.e., the area ratio) is measured by the following method using a wavelength dispersive X-ray analyzer (WDX). First, the cross section of the central region of multilayer ceramic capacitor 10 in width direction W is exposed, and the image of the central region in the thickness direction in the first Ni layer as an underlying electrode layer in the central region of multilayer body 3 in stacking direction T is enlarged at a magnification of 10000 times. The field of view of the enlarged region is 6 µm×8 µm. Then, the enlarged region is mapped by WDX, and the area ratio (% by area) is measured based on the image obtained by mapping.

The present invention is not limited to the above-described embodiments, but various applications and modifications thereof can be made within the scope of the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A multilayer ceramic capacitor comprising:
a multilayer body including a plurality of dielectric ceramic layers and a plurality of internal electrode layers that are alternately arranged in a stack, the plurality of dielectric ceramic layers each containing Ba, Ti, Mn, and a rare earth element, the multilayer body having: (a) a first main surface and a second main surface that face each other in a stacking direction in which the plurality of dielectric ceramic layers and the plurality of internal electrode layers are stacked; (b) a first side surface and a second side surface that face each other in a width direction orthogonal to the stacking direction; and (c) a first end surface and a second end surface that face each other in a length direction orthogonal to both the stacking direction and the width direction;
a first external electrode on the first end surface and electrically connected to a first set of internal electrode layers of the plurality of internal electrode layers; and
a second external electrode on the second end surface and electrically connected to a second set of internal electrode layers of the plurality of internal electrode layers, wherein
a region where the first and second set of internal electrode layers overlap with each other in a view in the stacking direction is defined as an effective portion,
each of regions sandwiching the effective portion in the stacking direction is defined as a main surface outer layer portion,
each of regions sandwiching the effective portion in the width direction is defined as a side surface outer layer portion,
each of regions sandwiching the effective portion in the length direction is defined as an end surface outer layer portion, and
a ratio of a peak intensity of Mn by laser ICP to a peak intensity of Ti by laser ICP is an Mn/Ti peak intensity ratio,
a value of the Mn/Ti peak intensity ratio in a dielectric ceramic layer in at least one of the main surface outer layer portion, the side surface outer layer portion, and the end surface outer layer portion is in a range of two times to fifteen times a value of the Mn/Ti peak intensity ratio in a dielectric ceramic layer in a central portion of the effective portion in the width direction, the length direction, and the stacking direction.

2. The multilayer ceramic capacitor according to claim 1, wherein
a ratio of a peak intensity of a rare earth element by laser ICP to a peak intensity of Ti by laser ICP is a rare earth element/Ti peak intensity ratio,
a value of the rare earth element/Ti peak intensity ratio in the dielectric ceramic layer in the at least one of the main surface outer layer portion, the side surface outer layer portion, and the end surface outer layer portion is in a range of two times to ten times the value of the rare earth element/Ti peak intensity ratio in the dielectric ceramic layer in the central portion of the effective portion.

3. The multilayer ceramic capacitor according to claim 2, wherein the value of the rare earth element/Ti peak intensity ratio in the dielectric ceramic layer in the at least one of the main surface outer layer portion, the side surface outer layer portion, and the end surface outer layer portion is in the range of two times to seven times the value of the rare earth element/Ti peak intensity ratio in the dielectric ceramic layer in the central portion of the effective portion.

4. The multilayer ceramic capacitor according to claim 1, wherein the value of the Mn/Ti peak intensity ratio in the dielectric ceramic layer in each of the main surface outer layer portion, the side surface outer layer portion, and the end surface outer layer portion is in the range of two times to fifteen times the value of the Mn/Ti peak intensity ratio in the dielectric ceramic layer in the central portion of the effective portion.

5. The multilayer ceramic capacitor according to claim 4, wherein
a ratio of a peak intensity of a rare earth element by laser ICP to a peak intensity of Ti by laser ICP is a rare earth element/Ti peak intensity ratio,
a value of the rare earth element/Ti peak intensity ratio in the dielectric ceramic layer in the at least one of the main surface outer layer portion, the side surface outer layer portion, and the end surface outer layer portion is in a range of two times to ten times the value of the rare earth element/Ti peak intensity ratio in the dielectric ceramic layer in the central portion of the effective portion.

6. The multilayer ceramic capacitor according to claim 5, wherein the value of the rare earth element/Ti peak intensity ratio in the dielectric ceramic layer in the at least one of the main surface outer layer portion, the side surface outer layer portion, and the end surface outer layer portion is in the range of two times to seven times the value of the rare earth element/Ti peak intensity ratio in the dielectric ceramic layer in the central portion of the effective portion.

7. The multilayer ceramic capacitor according to claim 4, wherein
a ratio of a peak intensity of a rare earth element by laser ICP to a peak intensity of Ti by laser ICP is a rare earth element/Ti peak intensity ratio,
a value of the rare earth element/Ti peak intensity ratio in the dielectric ceramic layer in each of the main surface outer layer portion, the side surface outer layer portion, and the end surface outer layer portion is in a range of two times to ten times a value of the rare earth element/Ti peak intensity ratio in the dielectric ceramic layer in the central portion of the effective portion.

8. The multilayer ceramic capacitor according to claim 7, wherein the value of the rare earth element/Ti peak intensity ratio in the dielectric ceramic layer in each of the main surface outer layer portion, the side surface outer layer portion, and the end surface outer layer portion is in the range of two times to seven times the value of the rare earth element/Ti peak intensity ratio in the dielectric ceramic layer in the central portion of the effective portion.

9. The multilayer ceramic capacitor according to claim 1, wherein
a ratio of a peak intensity of a rare earth element by laser ICP to a peak intensity of Ti by laser ICP is a rare earth element/Ti peak intensity ratio,
a value of the rare earth element/Ti peak intensity ratio in the dielectric ceramic layer in each of the main surface outer layer portion, the side surface outer layer portion, and the end surface outer layer portion is in a range of two times to ten times a value of the rare earth element/Ti peak intensity ratio in the dielectric ceramic layer in the central portion of the effective portion.

10. The multilayer ceramic capacitor according to claim 9, wherein the value of the rare earth element/Ti peak intensity ratio in the dielectric ceramic layer in each of the main surface outer layer portion, the side surface outer layer portion, and the end surface outer layer portion is in the range of two times to seven times the value of the rare earth element/Ti peak intensity ratio in the dielectric ceramic layer in the central portion of the effective portion.

11. The multilayer ceramic capacitor according to claim 1, wherein the first and second external electrodes include:
a first Ni layer on each of the first end surface and the second end surface of the multilayer body, respectively;
a second Ni layer on the first Ni layer; and
an Sn layer on the second Ni layer.

12. The multilayer ceramic capacitor according to claim 1, wherein the plurality of internal electrode layers each have a thickness of 0.4 μm or less.

13. The multilayer ceramic capacitor according to claim 1, wherein the plurality of internal electrode layers each have a thickness of 0.3 μm or less.

14. The multilayer ceramic capacitor according to claim 1, wherein the plurality of dielectric ceramic layers each have a thickness of 0.6 μm or less.

15. The multilayer ceramic capacitor according to claim 1, wherein the first and second external electrodes contain a dielectric composition of the plurality of dielectric ceramic layers in a ratio of 25% by area to 40% by area.

* * * * *